April 8, 1969     E. CONDOLIOS     3,437,205
HYDROCYCLONE SEPARATORS
Filed July 26, 1966
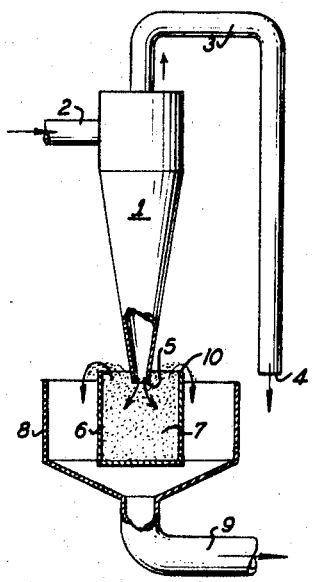
FIG. 1
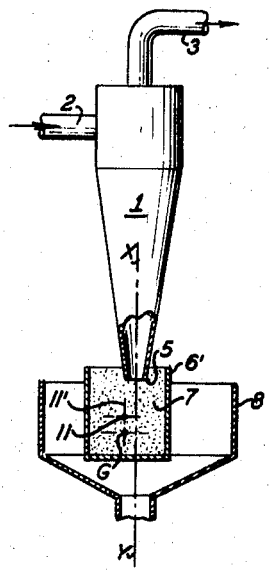
FIG. 2
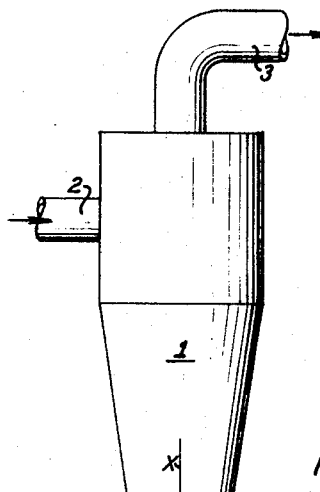
FIG. 4
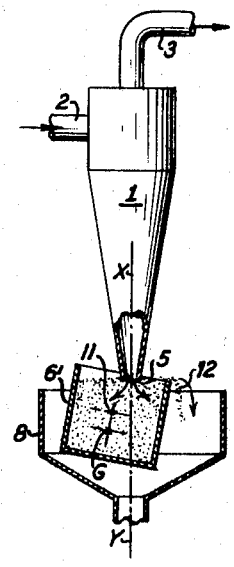
FIG. 3
INVENTOR
ELIE CONDOLIOS
BY
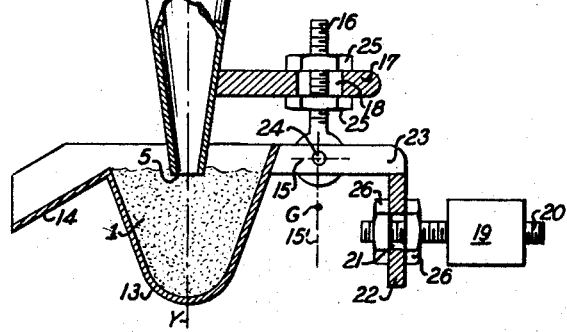
ATTORNEY

United States Patent Office 3,437,205
Patented Apr. 8, 1969

3,437,205
HYDROCYCLONE SEPARATORS
Elie Condolios, Grenoble, France, assignor to Societe Grenobloise d'Etudes et d'Applications Hydrauliques, Grenoble, France, a corporation of France
Filed July 26, 1966, Ser. No. 567,870
Claims priority, application France, July 29, 1965, 4,824; June 23, 1966, 4,962
Int. Cl. B04c 5/12; B01d 21/26
U.S. Cl. 210—84       8 Claims

ABSTRACT OF THE DISCLOSURE

The granular material separating apparatus herein is composed of a cyclone separator having its lower discharge orifice located in a receptacle below an overflow edge of the latter so that during the feed of the mixture being separated such discharge orifice is maintained immersed in a mass of separated out granules and entrained liquid and a dried granular product is continuously discharged over the overflow edge, the apparatus including means to collect the granular overflow.

---

This invention relates to a method of and apparatus for extracting granular materials from liquids, and more particularly to the type of separating operation which may be effected by the use of a hydrocyclone.

In the practice of separating granular materials from the liquids containing them by the employment of cyclones, it is frequently attempted to extensively dry the granular product emerging at the point of the cyclone so that it contains as little liquid as possible. Thus, for instance, in the case of the separation of sand from water, it is desirable to discharge at the point of the cyclone, a product containing between 20 and 25% water by weight. However, if the installation comprises only an ordinary cyclone, it is not always capable of satisfactorily producing such result. This is so because, even though one may succeed in discharging from such an ordinary cyclone, or rather an ordinary cycloning unit, of given rated capacity, a product having the desired degree of moisture, should the hourly feed tonnage exceed this rated capacity, a part of the sand to be dried discharges as overflow and is lost. On the other hand, should the hourly feed tonnage become less than the rated tonnage, the moisture in the extracted product is greatly increased, and at the limit for a very low tonnage, the sand will emerge at the point of the cyclone in a strong stream of water. Such operating conditions due to the inability of the cycloning unit to accommodate itself satisfactorily to the fluctuations in the hourly feed tonnage, are in general detrimental to the proper operation of an installation which comprises such cycloning unit. Numerous arrangements have been proposed and studied by the art in an effort to remedy these defects and involved the employment of gates and valves, an the adjustment of pressures and rates of flow. So far as applicant is aware however, such arrangements have not fully achieved their objectives for various reasons, and in industrial practice they have been found to give satisfaction only in rare cases.

It is the primary purpose of this invention to provide a cycloning installation which is capable of providing a product dried to a low and substantially constant degree of moisture, whatever the support liquid employed, the amount of material contained therein, or the variation in the hourly feed tonnage of such material.

In accordance with the invention, the aforesaid purpose and other objectives are accomplished by maintaining the pointed end of the cyclone slightly immersed in wet discharged material contained in a receptacle located below such cyclone point so that the wet material emerging from the point of the cyclone is continuously discharged into the wet material of the container below the surface of the latter, and so that such emerging wet material overflows from the container as it emerges from the cyclone. The relative position of the receptacle or container with respect to the cyclone is made such that when the apparatus is stopped, the pointed end of the cyclone is slightly below the overflow edge of the receptacle. The adjustment of the hydraulic operation of the cyclone may be effected by any suitable means known to the art and in such manner that the average pressure at the point of the cyclone is very slightly less than the pressure of the outer atmosphere when the cyclone is fed solely with the support liquid for the product. Thus, when the cyclone is fed with a mixture of such support fluid and the product material, the average pressure at the cyclone point will increase, and the product will emerge from the cyclone point under the influence of this increased average pressure which will also be transmitted through the product into the mass of the material contained in the receptacle and cause the overflow.

A better understanding of the invention will be obtained from a consideration of the following description when read in connection with the accompanying drawings; in which FIG. 1 is a schematic view of a cyclone having a fixed receptacle located below its point and feeding material thereto;

FIG. 2 is a view similar to FIG. 1 showing the cyclone associated with an oscillating receptacle; the feed of material being stopped;

FIG. 3 is a view similar to FIG. 2 and showing the arrangement of the latter, but with the installation in operation; and FIG. 4 is a view similar to FIGS. 2 and 3 and shows in greater detail the means for supporting the oscillating receptacle.

The embodiments of the invention which are shown by way of example in the aforesaid drawings, shall be hereinafter described for purposes of illustration with reference to the drying of sand. In these drawings, the numeral 1 designates generally a conventional type of hydrocyclone of known construction and having connected thereto the usual tangential feed conduits 2 for feeding liquid and material to the cyclone. The cyclones 1 are provided at their upper ends with upper discharge conduits 3 for the liquid; such conduits 3 as is shown in FIG. 1, having a discharge end 4 located substantially at the level of the point 5 of the cyclones so as to enable the proper hydraulic regulation of such cyclones to be made. This regulation may be made by any known means such as by valves provided at the discharge ends 4 of the conduits 3, and/or by causing the conduit 3 to discharge into a constant level tank in which its discharge end 4 is immersed. Below the point 5 of each cyclone is provided a receptacle into which is discharged the wet material emerging from such cyclone point.

In the embodiment of the invention shown in FIG. 1 of the drawings, the receptacle or container 6 is stationary and is suitably positioned with relation to its associated cyclone so that the point 5 of such cyclone is slightly below the overflow edge 10 of such receptacle. The receptacle 6 is located in a hopper 8 which receives the material passing over the overflow edge or edges 10 of the receptacle 6 and guides the same to a discharge conduit 9.

When the operation of the cyclone unit is ready to be started, the receptacle 6 is filled with a mass 7 of the material to be treated, thereby causing the point or nozzle 5 of the cyclone to be slightly immersed in such material.

Thus, as soon as the cyclone 1 is fed with material and the product material emerges from its discharge nozzle 5 under a given average pressure, such pressure will be transmitted into the mass of material 7 contained in the receptacle 7 and cause it to overflow over the upper edges 10 of the receptacle and into the receiving hopper 8. The material which overflows has a low moisture content which remains substantially constant despite the possible variations in the amount of the material in the feed flow. Throughout such operation of the unit, the nozzle 5 of the cyclone will remain immersed in the mass of material 7 and when the operation is terminated it will still be immersed in such material. Consequently, on repeated cycles of operation of the unit for processing the same material it will not be necessary to charge the receptacle 6 with such material.

The cyclone unit illustrated in FIG. 1 of the drawings, operates satisfactorily provided the material in the feed flow is adequately controlled. When however, the rate of discharge of the material product emerging from the cyclone nozzle 5 is such that the level of the mass of material 7 in the receptacle 6 rises, such nozzle 5 will become immersed in such material to a greater extent than it was when originally adjusted. This increase in the embedding of the nozzle or point 5 has the effect of requiring a higher pressure at the inlet end of the cyclone. Furthermore, it has been found that under such conditions, as soon as the proportion of coarse materials, that is to say more than about a millimeter, reaches a very high value, the porosity increases substantially so that the pressure of the materials is no longer transmitted throughout the mass. The overflow will then take place under poor conditions, and water will emerge from the cyclone without properly carrying along the materials which will then accumulate in the cyclone and emerge through the upper orifice thereof and pass into the conduit 3.

In order to avoid such possible drawbacks, the invention further contemplates providing additional means which permit a self or automatic regulation of the immersion of the cyclone point to maintain a minimum admission pressure, and which is applicable to all particle sizes. Such means accomplishes this self-regulation, in accordance with the invention, by permitting automatic displacement of the receptacle as a function of the average discharge pressure of the material at the point of nozzle 5 of the cyclone, which pressure is in turn bound to the rate of flow of the material. The said means is so constructed and arranged that when the rate of flow of the material increases, the receptacle will be automatically displaced to cause a decrease in the immersion of the cyclone point.

As is shown in FIGS. 2 and 3 of the drawings, this automatic displacement of the receptacle may be accomplished by mounting the receptacle 6' on a horizontal shaft so that it can oscillate about a horizontal axis 11 which is located in a vertical line 11' in FIG. 2 that passes through the center of gravity G of the receptacle when such receptacle is full of the material 7, and which is positioned above such center of gravity G. The horizontal shaft may be supported in any suitable fashion, as by mounting it on parts which are rigidly connected to the cyclone, or which are secured to independent foundations. The receptacle 6' is arranged with relation to the cyclone 1 so that its said center of gravity is offset with respect to the X–Y axis of such cyclone. The eccentricity of the receptacle's suspension with relation to the axis of the cyclone is so selected that the receptacle will have a given sensitivity of movement about its axis 11. FIG. 2 of the drawings shows the receptacle 6' in its position of initial equilibrium with respect to its horizontal axis of articulation 11 when the installation or unit is ready to be operated and before the overflow starts, this position of the receptacle being the same upon stopping of such overflow when the operation of the unit is terminated. In such condition of the unit the point or nozzle 5 of the cyclone will be immersed to a short extent in the wetted product 7. As soon as the installation starts operating, the outlet pressure of the material emerging from the cyclone nozzle 5 on the material 7 in the receptacle 6' will cause the latter to be tilted about its axis 11 until it assumes a new position of equilibrium, as shown in FIG. 3 of the drawings. Should there occur during the operation of the unit, variations in the material of the feed flow resulting in a tendency of the discharging material to rise in the receptacle, the receptacle 6' will vary its position about its axis 11 to assume new positions of equilibrium corresponding to such changing conditions. Thus, the receptacle will automatically adjust its position about the axis 11 to maintain the immersion of the nozzle 5 in the material 7 at a given low value while permitting the overflow of the material at 12 in FIG. 3.

FIG. 4 of the drawings shows a cyclone installation which differs from the construction of FIGS. 2 and 3 in which the center of gravity G is located within the confines of the receptacle 6', in that such center of gravity is located outside the area of the container 13 in such installation. As is shown in FIG. 4, the container 13 which has a rectangular cross-section is provided on one side thereof with an inclined plane overflow 14. Secured to the opposite side of the container 13 are a pair of spaced, parallel, outwardly projecting arms 23 which are supported for pivotal movement about a horizontal axis 15, by a shaft 24 and a threaded bolt 16, the head of the latter being located between such arms 23 and the shaft 24 extending through such head and the arms 23. The threaded shank of the bolt 16 extends up vertically through a longitudinally extending slot 18 in an elongated plate 17 secured at one end to the cyclone 1, and is adjustably connected to such horizontal supporting plate 17 by a pair of nuts 25, 25 threadedly engaged with such shank and engaging the top and bottom surfaces of such plate. The outer ends of the arms 24 have secured thereto one end of vertically depending elongated plate 22 provided with a longitudinally extending slot 21. Adjustably connected to the vertical supporting plate 22 is a horizontally disposed threaded rod 20, one end of which extends through the slot 21 of such plate and is clamped to the plate 22 by a pair of nuts 26, 26 which are in threaded engagement with such rod end. Threadedly engaged with the projecting portion of rod 20 is a counterweight 19.

It will be understood from the foregoing, that the container 13 is supported for pivotal movement about the horizontal axis 15 by the arms 23, bolt 16, nuts 25, 25, the horizontal supporting plate 17 and cyclone 1. The position of the axis 15 may be adjusted vertically by vertical displacement of the bolt 16 relative to its supporting plate 17, and horizontally by horizontal displacement of the bolt 16 along the slot 18 of plate 17. The immersion of the bottom nozzle 5 of the cyclone 1 in the wetted material 7 in the container 13, and its horizontal position with respect to this container, can thus be adjusted to suit operating conditions. As indicated, as a result of these adjustments, the discharge end of the nozzle 5 will be located below the line of juncture of the inclined plane overflow 14 with the one side of the container 13.

The counterweight 19 is moved horizontally on the threaded rod 20 to adjust the horizontal position of the center of gravity G of the oscillating container device to bring it on a vertical line 15' passing through the pivotal axis 15. This adjustment is made with the container 23 full of the material to be treated and while the cyclone is not operating. The vertical position of the center of gravity G can be adjusted along the said vertical line 15' by vertically displacing the threaded rod 20 in the groove 21 of its supporting plate 22.

In FIG. 4 of the drawings, the container 13 is shown in its adjusted initial equilibrium position, i.e., the cyclone 1 is not yet operating, the container has been filled with the material 7 to be treated so that the installation is ready for the start of its operation, and the end of the nozzle 5 of the cyclone 1 is slightly immersed to a given value in the reservoir of material 7 in the container. Upon the start of the operation of this cyclone unit, the outlet pressure of the material emerging from nozzle 5, will be transmitted to the reservoir material 7 to cause the tilting of the receptacle 13 about its axis 15 to a new position of equilibrium at which the end of nozzle 5 will be maintained immersed in the material 7 at the given value for which the unit has been adjusted while permitting the overflow of material into the overflow 14; such operation being essentially the same as that described in connection with the embodiment of FIGS. 2 and 3.

It will be noted that in all of the above described embodiments when the feed of material is stopped, the overflow ceases and the point of the cyclone remains immersed in the reservoir material in the container. Additionally, in the case of the cyclone units disclosed in FIGS. 2 and 3 and in FIG. 4, when such feed is stopped, the displaceable receptacles will resume their position of initial equilibrium. Also, when the feed of material is stopped in each of the embodiments, the level of the water in the mass of material 7 remaining in the container, will descend under the action of the central aspiration of the cyclone to the level of the discharge orifice of the cyclone point and become stabilized, a slight amount of air being then aspirated within the cyclone through the upper layer of the reservoir material 7. Under such conditions the installations are ready to operate as soon as they are again fed with material.

The receptacles in the aforesaid embodiments may each have a depth which is variable and which can be so adjusted that there is maintained therein an amount of material sufficient to maintain the point of the associated cyclone immersed to the desired amount and thereby to cause the discharge of the material emerging from such point to take place at a rate suitable to assume a proper overflow from the receptacle. Also the cross-sectional area of the upper end of the receptacle must be sufficient to permit the passage of the material between the point of the cyclone and the side walls of the receptacle in such manner that the material can easily overflow. In actual practice the cross-sectional area of the receptacle at its upper end at least may be of the order as from 5 to 10 times the cross-sectional area of the point of the cyclone.

While there has been described hereinabove, and illustrated in the accompanying drawings, preferred embodiments of the invention, it will be understood by those skilled in the art that various changes in such embodiments may be made without departing from the spirit of the invention or the scope of the appended claims.

What is claimed is:

1. The method of separating granular material from a mixture thereof with a support liquid so as to produce continuously a substantially uniform granular product dried to a low and substantially constant degree of moisture regardless of variations in the supply of such mixture, which comprises starting with a receptacle means having an overflow edge initially filled with a mass of the granular material, and with the bottom apex of a hydrocyclone separator provided with an opening only slightly immersed in such mass of granular material so that the pressure of the wetted material constituted of the separated granules and entrained liquid discharging through the apex opening and into such mass of granular material is just sufficient to cause a flow of the granular material out of the receptacle means, and feeding said mixture into the hydrocyclone separator while maintaining such opening continually immersed in the granular material in the receptacle means so that the wetted material emerging from the separator is initially and thereafter continuously discharged into the mass of granular material in the receptacle means below the level of such mass to initially and thereafter continuously cause a flow over said overflow edge of a granular product having a substantially constant low moisture content, and then collecting such overflow granular product of low moisture content, the amount of immersion of the apex opening in the mass of material being selected to cause the material emerging from such opening to impart a given minimum average pressure to the material in said mass, and then varying the level of such mass while maintaining the immersion of the opening in accordance with variations in the rate of flow of the material to the cyclone to maintain such given average pressure.

2. The method of producing by a hydrocyclone separator having at its bottom an apex provided with a discharge opening, a product material having a low degree of moisture from a mixture thereof with a support liquid, which comprises placing below the apex of the cyclone, receptacle means for receiving the material from the discharge opening of such apex and from which the material overflows as it emerges from the cyclone, in such position relative to the cyclone that such cyclone discharge opening is located below the overflow edge of the receptacle means and during the feed of the material to the cyclone is continuously immersed in the wetted material contained in the receptacle means, so that during such feed of the material to the cyclone, the wetted material emerging from the cyclone is being continuously discharged into the mass of wetted material in the receptacle means below the level of such mass, the amount of immersion of the apex opening in the mass of material being selected to cause the material emerging from such opening to impart a given average pressure to the material in said mass, and then varying the level of such mass in accordance with variations in the rate of flow of the material to the cyclone to maintain such given average pressure, said given average pressure being established while the center of gravity of the receptacle means with a full charge of material is off-center with relation to the longitudinal axis of the cyclone, and then during variations in the rate of flow of the material oscillating the mass of material carried by the receptacle means about a horizontal axis located on a vertical line which passed through both such horizontal axis and the center of gravity of the receptacle means when such given average pressure was so established.

3. Apparatus for separating granular material from a mixture thereof with a support liquid so as to produce continuously a substantially uniform granular product dried to a low and substantially constant degree of moisture regardless of variations in the supply of such mixture, comprising a cyclone separator having at its lower end an apex provided with an orifice through which is discharged a wetted material constituted for the separated out granules and entrained liquid, and product receiving means positioned at the lower end of the separator and including a receptacle located below the cyclone discharge orifice in position to receive the wetted material discharged through such orifice and having an overflow edge located slightly above said orifice, the relation of such orifice and overflow edge being such that when said receptacle is filled with a mass of the granular material prior the start of operation of the apparatus, the apex orifice will be slightly immersed in such mass of granular material to provide an average pressure at such orifice slightly less than the pressure of the outer atmosphere when the cyclone separator is fed solely with the support liquid for the product, and such that when said wetted material is discharged through such orifice and into such mass of granular material the pressure thereof is just sufficient to cause an immediate flow of the granular material out of the receptacle, whereby during the feed of the mixture to the separator the wetted material emerging from the separator is initially and thereafter continuously discharged into the mass of granulated material in the receptacle below the level of such mass to initially and thereafter continuously cause a flow over said overflow edge of a granular product having a substantially low moisture content, said product receiving means including means for receiving the granular product flowing over said overflow edge, said product receiving means including means movably supporting said receptacle and automatically operable to vary the level of such mass of granular material without disrupting the immersion of said orifice in such mass, in accordance with variations in the rate of flow of the material to the cyclone separator so as to tend to maintain such given average pressure.

4. A hydrocyclone separator for producing material having a low degree of moisture from a mixture thereof with a support liquid, comprising a cyclone having at its lower end an apex provided with a discharge orifice for the product material, and product receiving means positioned at the lower end of the separator and including a receptacle located below the cyclone discharge orifice in position to receive the product material as it emerges from such orifice and having an overflow edge over which the product material discharges during the operation of the separator, said receptacle being so positioned relative to said cyclone that the lower end of the latter is located below said overflow edge of the receptacle, and while the material is discharging over such overflow edge during the feed of the material to the cyclone, is continuously immersed in the wetted material contained in said receptacle, whereby the wetted material emerging from said cyclone discharge orifice is being continuously discharged into the mass of wetted material in such receptacle below the level of such mass, said receptacle being constructed and arranged to position the discharge orifice of said cyclone relative to said overflow edge thereof so that the product material emerging from said cyclone discharge orifice imparts a given average pressure to the mass of material in said receptacle, and to vary the level of such mass in accordance with variations in the rate of flow of the material to the cyclone so as to tend to maintain such given average pressure, said product receiving means including means movably supporting said receptacle and enabling the latter to become automatically displaced on an increase in the average pressure of discharge of the material into said receptacle so as to correspondingly decrease the immersion of the pointed end of the cyclone, said supporting means supporting said receptacle for pivotal movement about a horizontal axis off-center with respect to the longitudinal axis of said cyclone, and located above the center of gravity of said product receiving means and on a vertical line that passed through such center of gravity and such pivotal axis when said given average pressure was established.

5. A hydrocyclone separator as defined in claim 4, in which the pivotal axis of said supporting means passes through said receptacle.

6. A hydrocyclone separator as defined in claim 4, in which the pivotal axis of said supporting means is located outside the area of said receptacle.

7. A hydrocyclone separator for producing a product material having a low degree of moisture from a mixture thereof with a support liquid, comprising a cyclone having at its lower end an apex provided with a discharge orifice for the product material, and product receiving means positioned at the lower end of the separator and including a receptacle located below the cyclone discharge orifice in position to receive the product material as it emerges from such orifice and having an overflow edge over which the product material discharges during the operation of the separator, said receptacle being so positioned relative to said cyclone that the lower end of the latter is located below said overflow edge of the receptacle, and while the material is discharging over such overflow edge during the feed of the material to the cyclone, is continuously immersed in the wetted material contained in said receptacle, whereby the wetted material emerging from said cyclone discharge orifice is being continuously discharged into the mass of wetted material in such receptacle below the level of such mass, said product receiving means, when said receptacle thereof is fully loaded, having a center of gravity offset from the longitudinal axis of said cyclone, and including means pivotally supporting said receptacle for movement about a horizontal axis off-center with respect to said cyclone longitudinal axis, and means for varying said center of gravity of said product receiving means with respect to a vertical line passed through said horizontal pivotal axis.

8. A hydrocyclone separator as defined in claim 7, in which said supporting means is operable to vary the horizontal pivotal axis of said receptacle relative to the lower end of said cyclone.

References Cited

UNITED STATES PATENTS

| | | | |
|---|---|---|---|
| 3,034,647 | 5/1962 | Gleisse | 210—512 |
| 3,101,313 | 8/1963 | Woodruff | 210—512 |
| 3,341,983 | 9/1967 | Baldenhofer et al. | 210—512 |

REUBEN FRIEDMAN, *Primary Examiner.*

JOHN ADEE, *Assistant Examiner.*

U.S. Cl. X.R.

210—112, 137, 512